Figure 9:
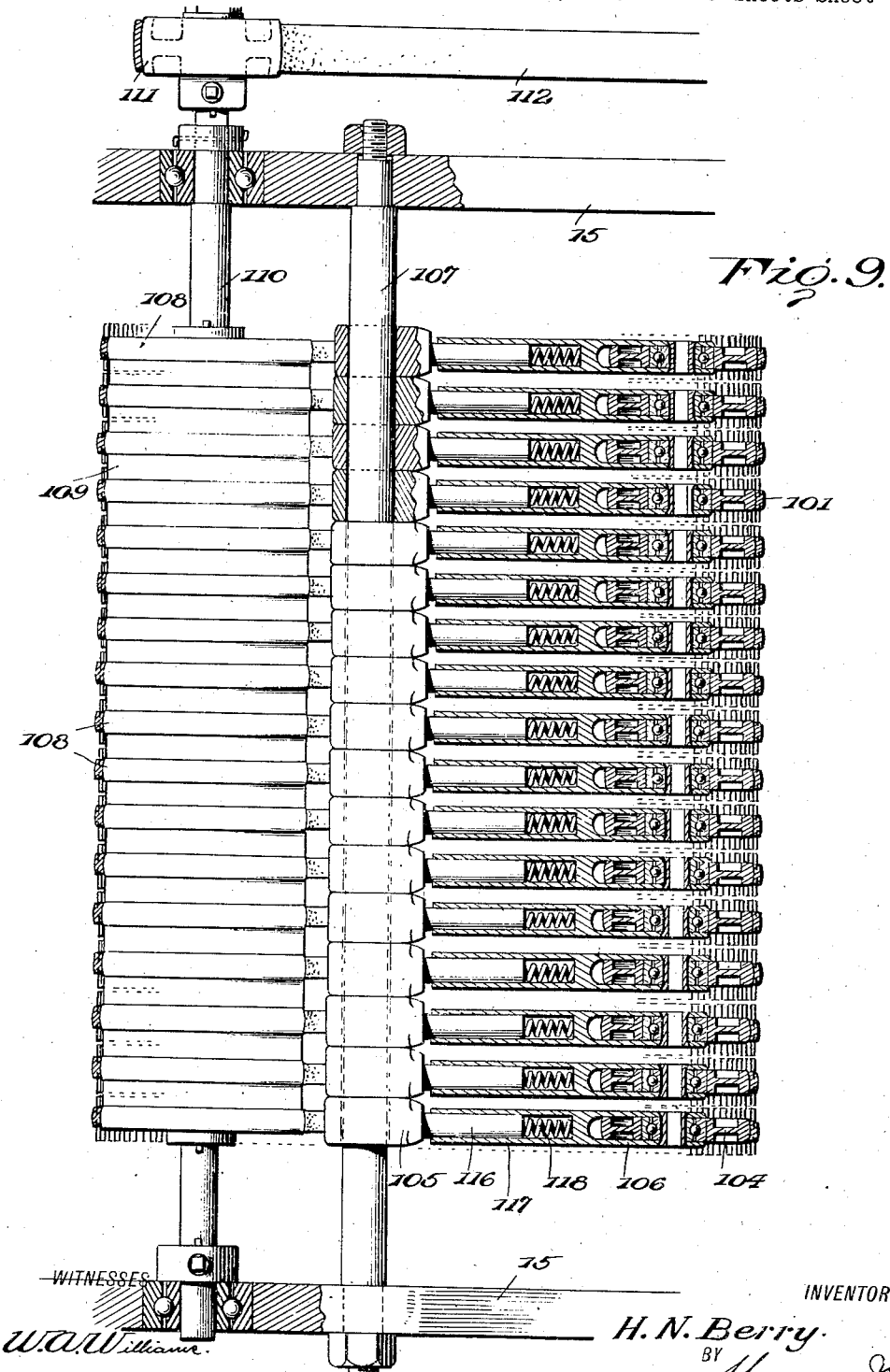

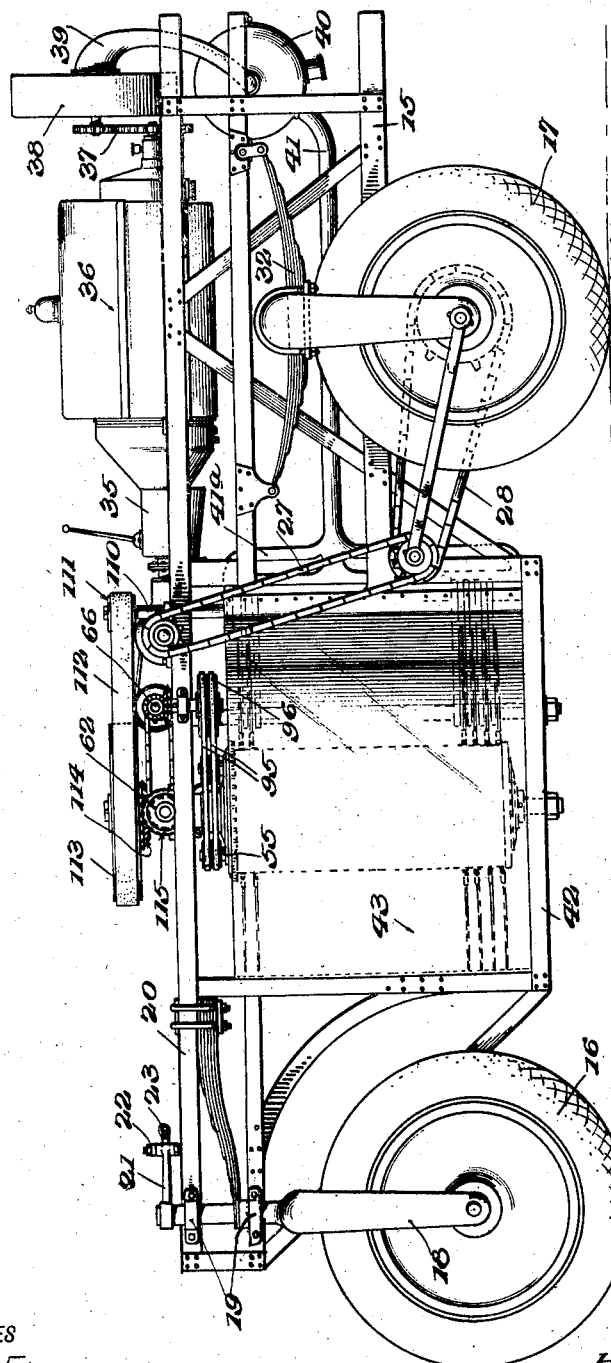

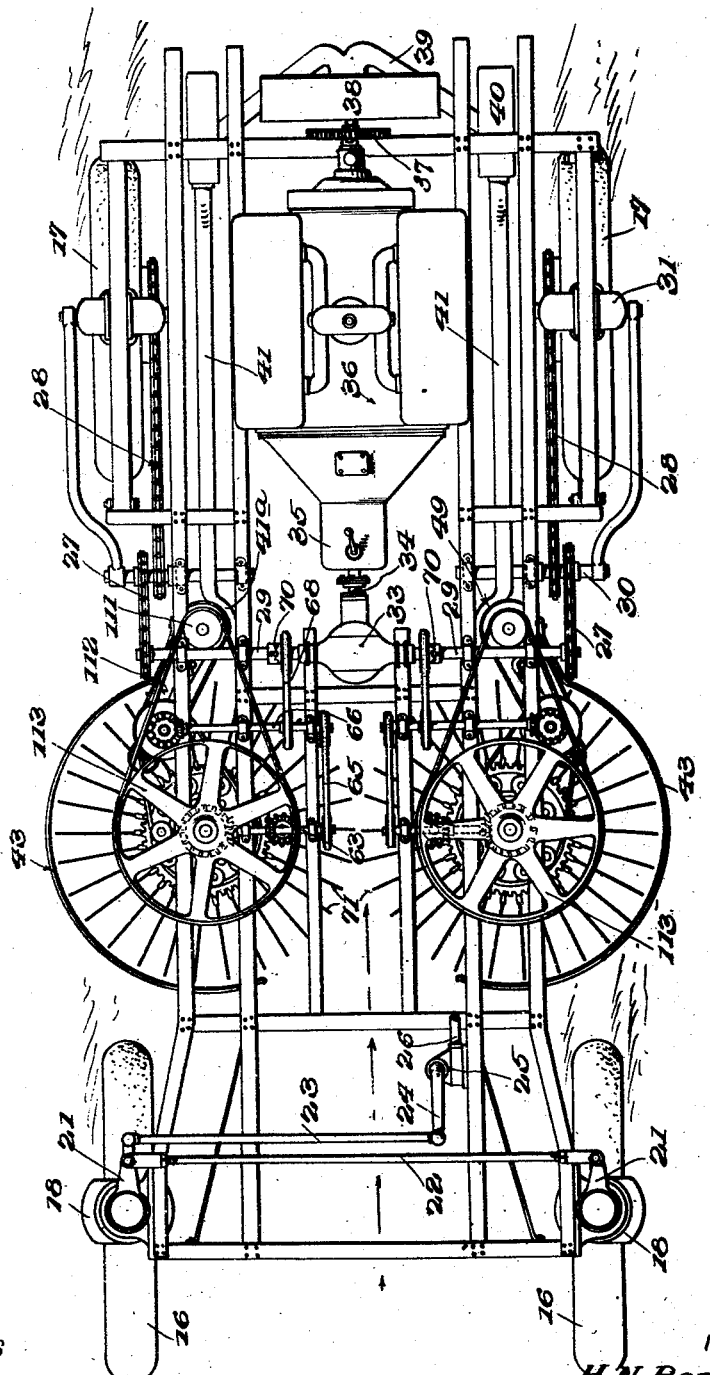

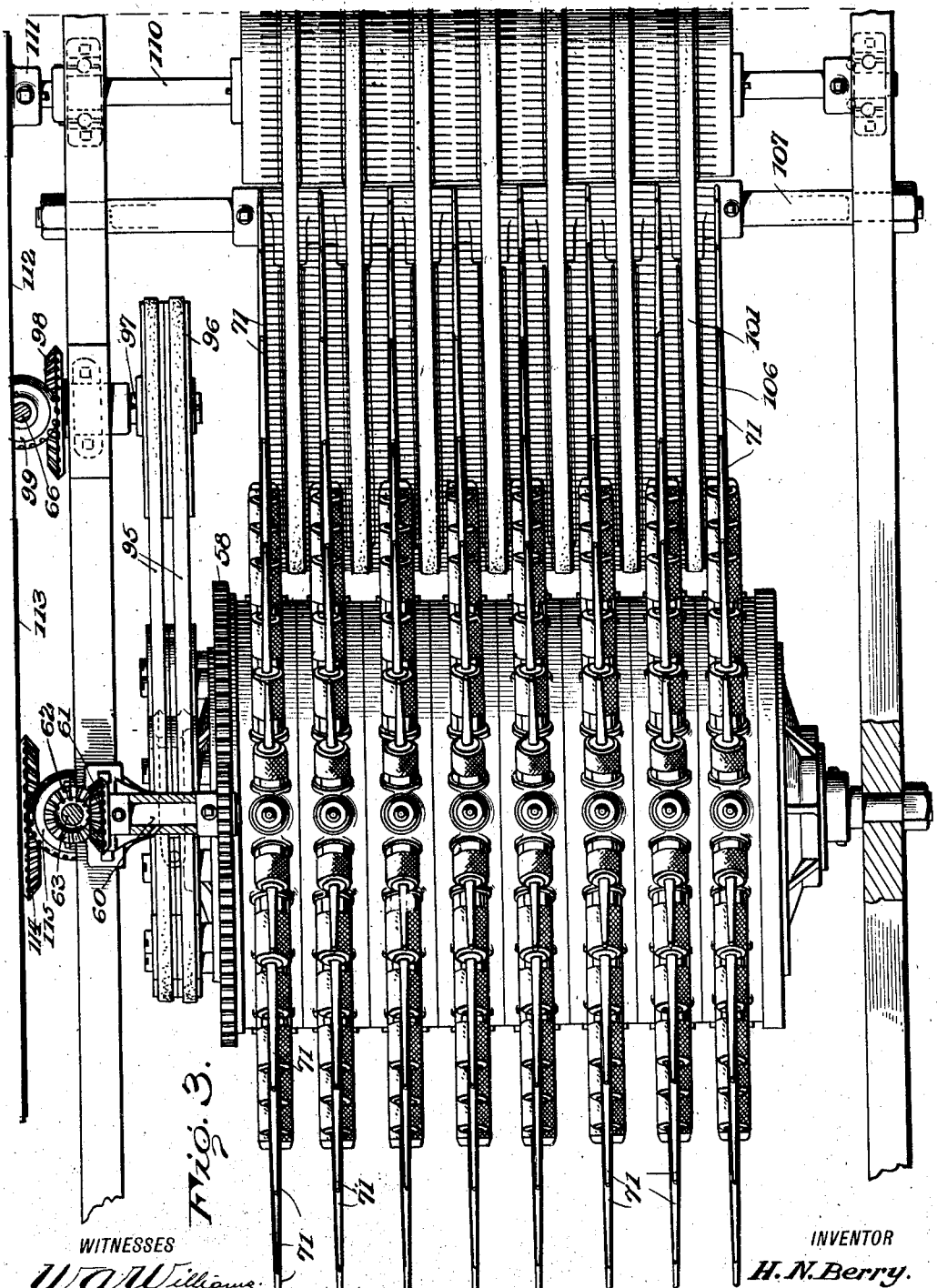

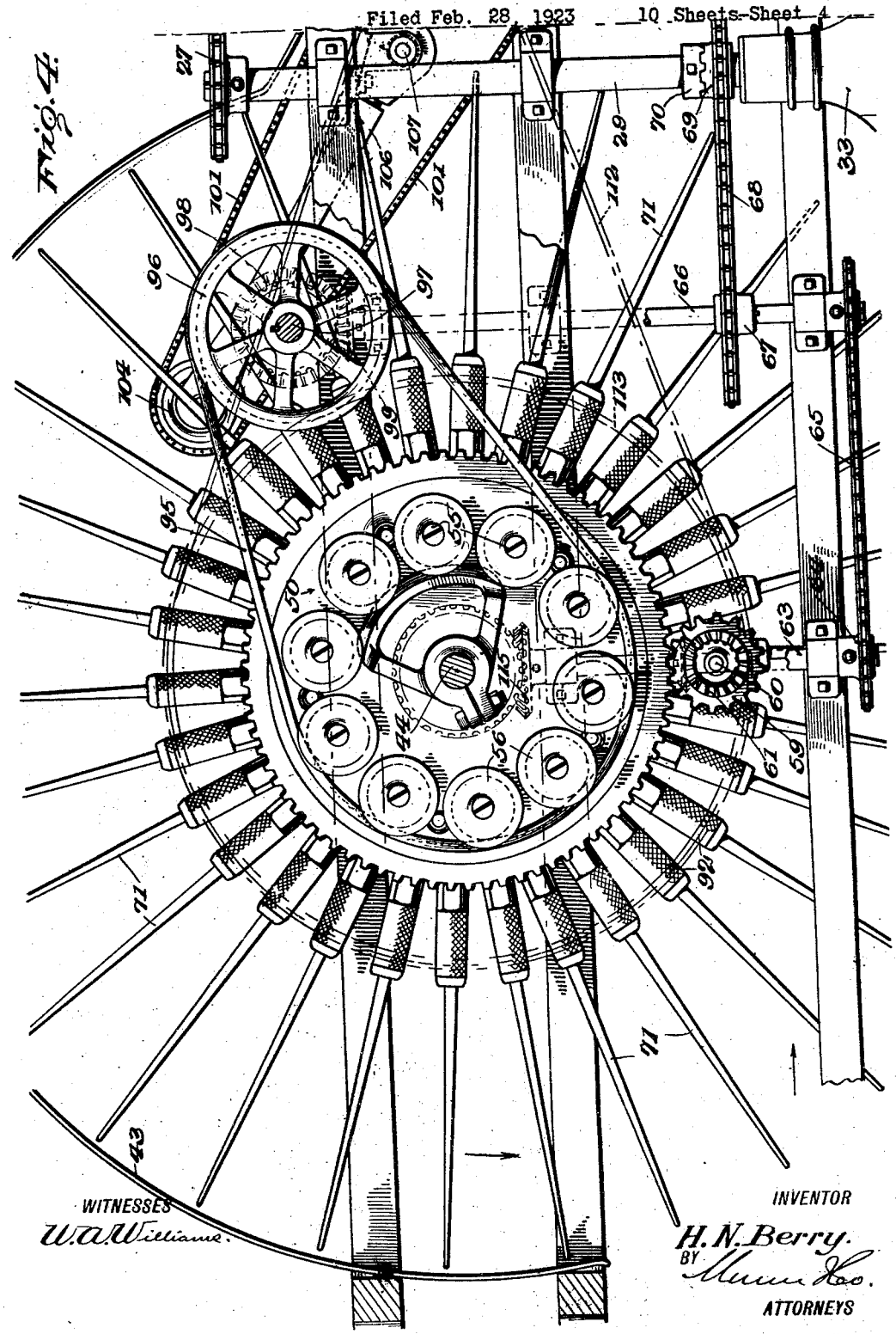

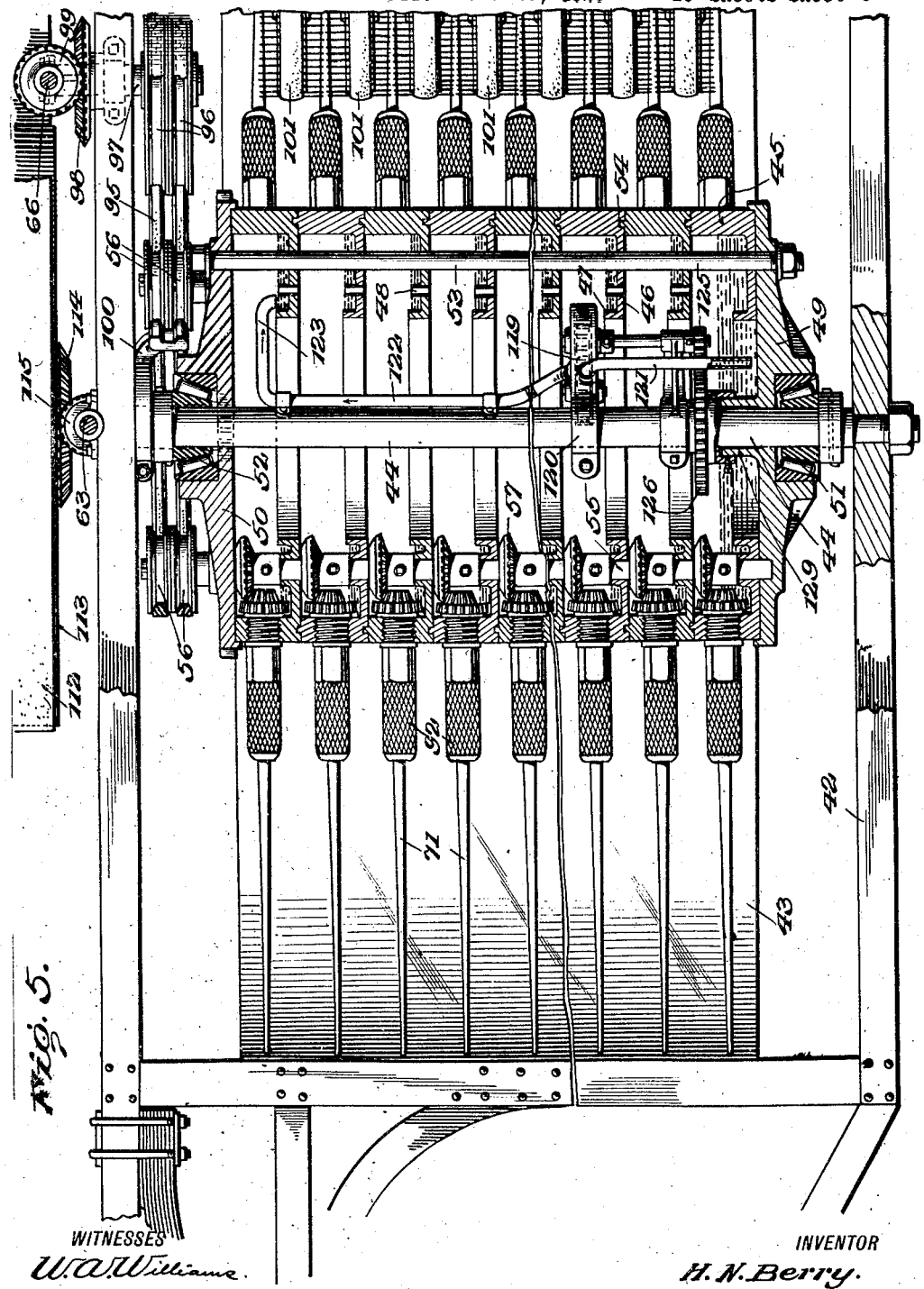

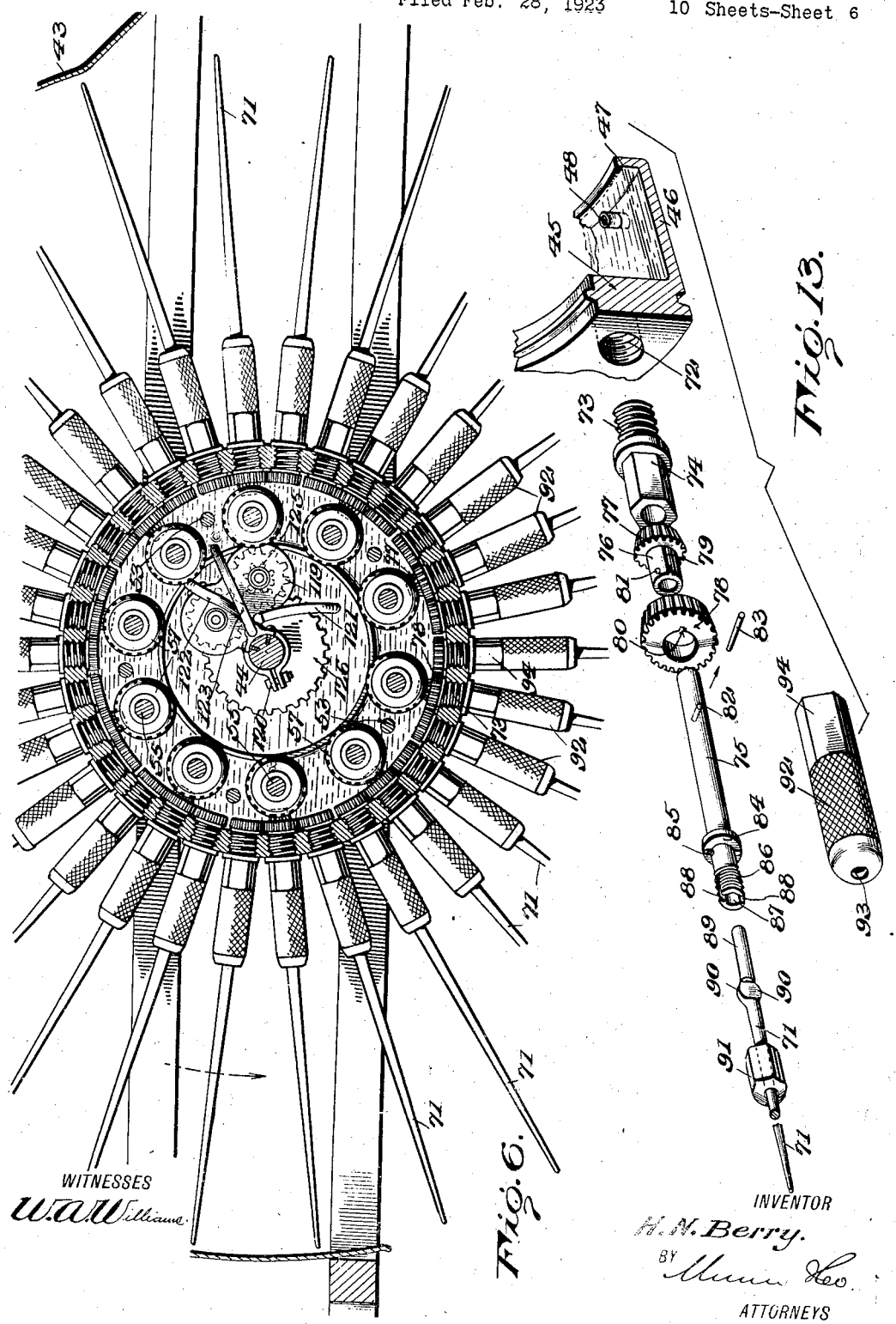

March 17, 1925.
H. N. BERRY
COTTON PICKER
Filed Feb. 28, 1923    10 Sheets-Sheet 7
1,530,151
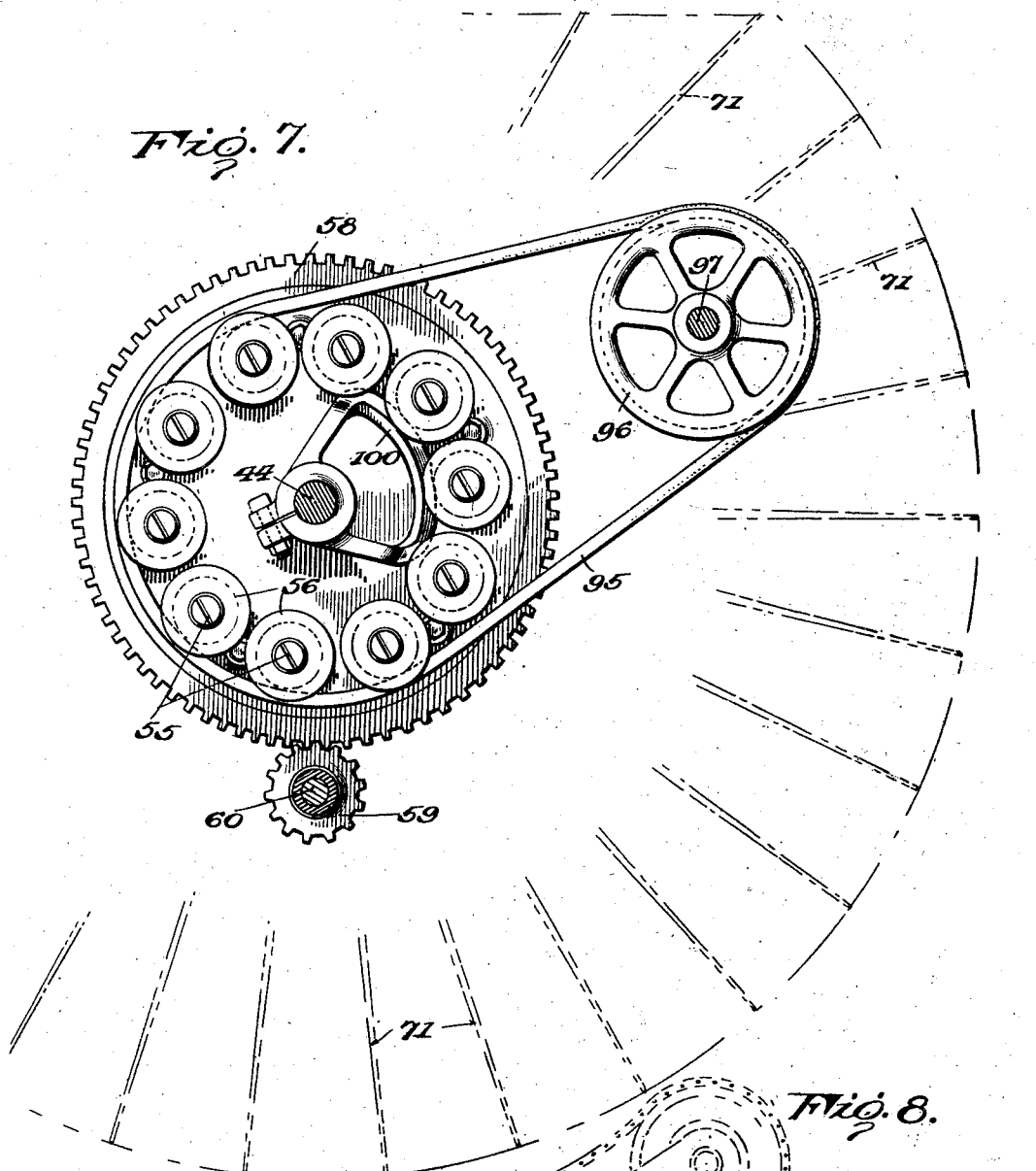

March 17, 1925.

H. N. BERRY

COTTON PICKER

Filed Feb. 28, 1923  10 Sheets-Sheet 8

INVENTOR
H. N. Berry.
BY
ATTORNEYS

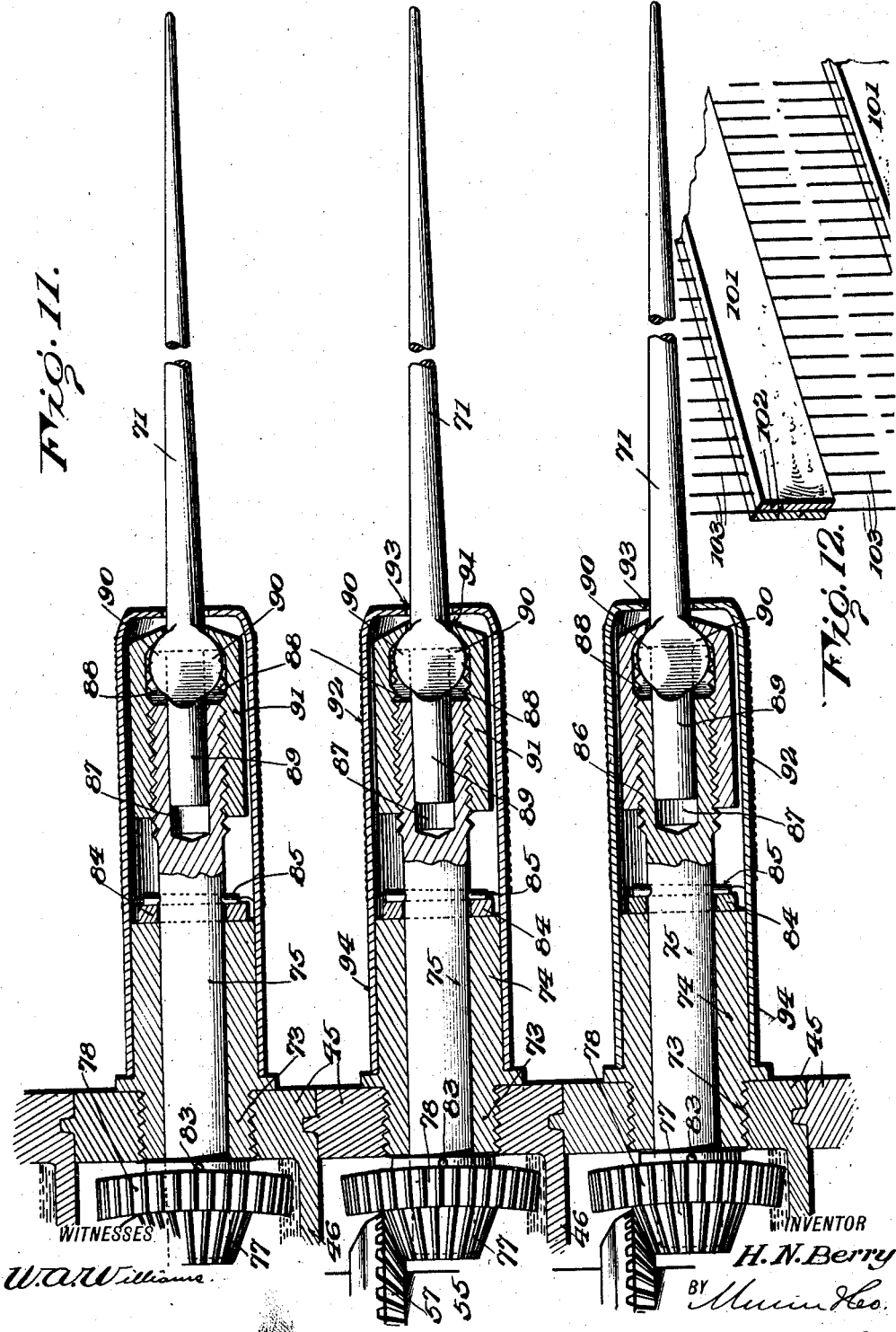

Patented Mar. 17, 1925.

1,530,151

UNITED STATES PATENT OFFICE.

HIRAM NEWTON BERRY, OF GREENVILLE, MISSISSIPPI, ASSIGNOR OF ONE-THIRD TO CHARLES R. BERRY AND ONE-THIRD TO HUGH A. GAMBLE, BOTH OF GREENVILLE, MISSISSIPPI.

COTTON PICKER.

Application filed February 28, 1923. Serial No. 621,835.

*To all whom it may concern:*

Be it known that I, HIRAM NEWTON BERRY, a citizen of the United States, and a resident of Greenville, in the county of Washington and State of Mississippi, have invented certain new and useful Improvements in Cotton Pickers, of which the following is a specification.

My present invention relates generally to cotton pickers, and more particularly to cotton picking machines of that type wherein laterally spaced and opposed and vertically disposed picking cylinders are utilized, having series of radially outstanding and rapidly rotating picking fingers. These cylinders are usually mounted within the frame of a vehicle adapted to straddle a row of cotton so that the cylinders may revolve at opposite sides of the plants whereby in their revolution, geared as they are to revolve at a speed equalling the speed of movement of the vehicle, little if any destructive effect upon the cotton plants is occasioned and the rapidly rotating picking fingers freely pass into and through the plant seeking the open cotton. Such cotton as is encountered by the fingers is by virtue of the rapid rotation of these fingers twisted or wrapped around the tips of the picking fingers and pulled away from the plant owing to the revolving movement of the picking cylinders.

In addition to the foregoing, machines of this nature commonly employ some means for taking the cotton off of the picking fingers and transporting it to a point where it may be collected in quantity, and the mechanism for accomplishing the removal of the cotton from the picking fingers, commonly known as the stripping mechanism, ordinarily coacts with the picking fingers at certain points in the circumferences of the cylinders removed or spaced from those points where the picking fingers in action enter the cotton plants.

Continuously operating machines of this well known type of mechanical picker have been subject to numerous disadvantages the result of which has been to limit and curtail successful employment in practical use, and among these disadvantages, certain of outstanding importance may be mentioned. In the first place it has not, up to the present time, been possible to utilize picking fingers in sufficient number around the cylinders to effectively perform the picking operation and as a consequence it has not been possible with this type of machine to cleanly pick a field of cotton. In the second place provision for proper lubrication of the parts and for the exclusion of dust, dirt and other foreign matter from the necessarily great number of small gears, have been neglected to such an extent that excessive wear has been the natural result, making it practically impossible to maintain the machines in effective operating condition for an appreciable time.

Another outstanding disadvantage has been the difficulty, and in most instances this has resulted in extreme inefficiency, of removing the cotton from the picking fingers after it has been picked. In other words the mechanism known as the stripping mechanism has been sadly ineffective even in comparison to the picking mechanism which is itself of doubtful efficiency as above pointed out.

My invention aims to provide a practical efficient machine which will avoid these disadvantages, which may be easily adapted to short or tall cotton plants, and which will be strong and durable in use.

In the accompanying drawings which illustrate my present invention and form a part of this specification, Figure 1 is a side elevation of the complete machine.

Figure 10:
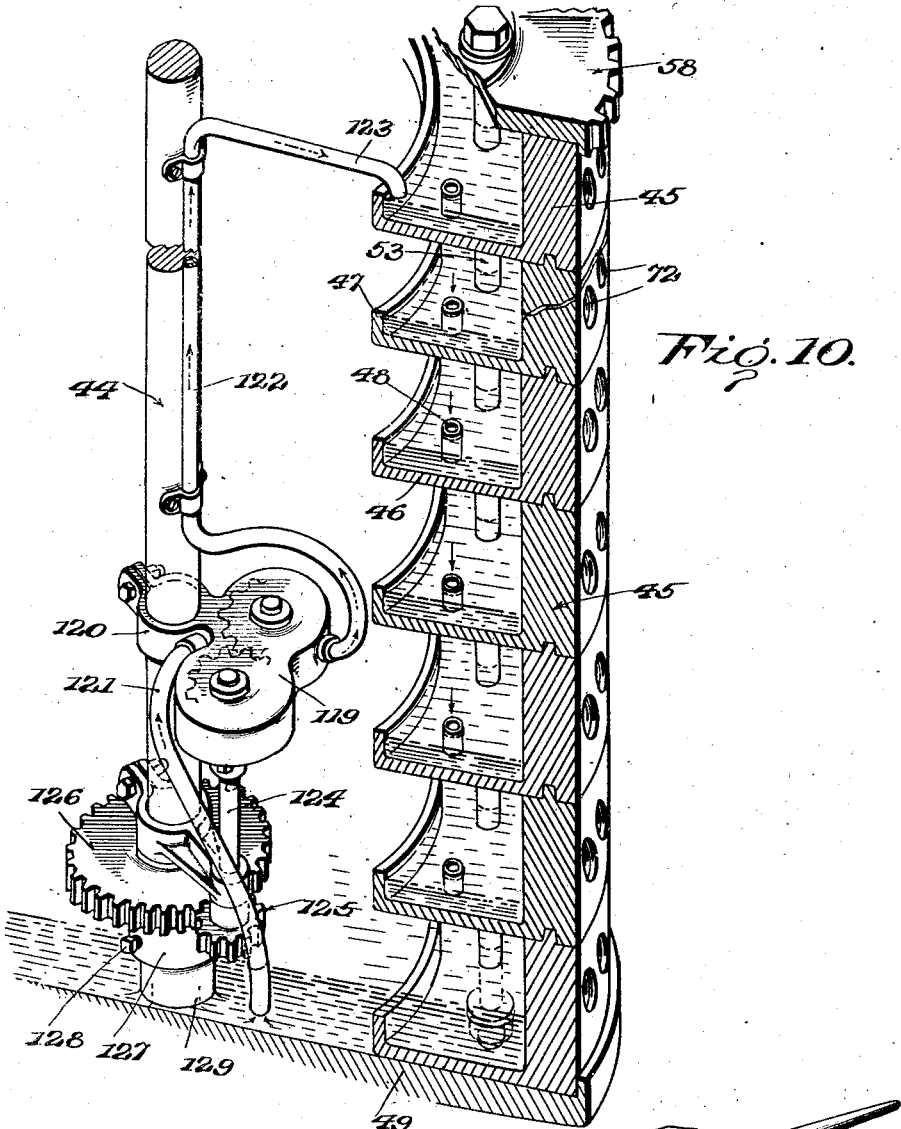
Figure 14:
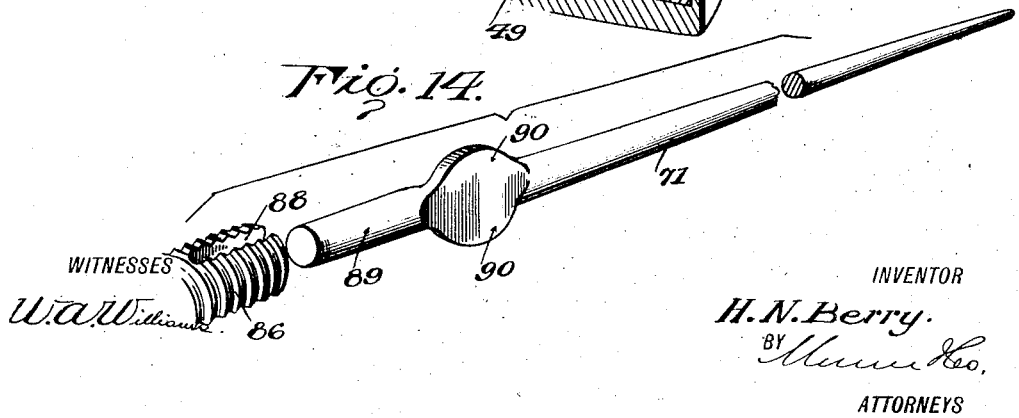

Figure 2 is a top plan view thereof,

Figure 3 is an enlarged side view in detail of one of the picking cylinders and the stripping mechanism applied thereto, certain of the parts being broken away and in section, Figure 4 is an enlarged top plan view in detail of one of the picking cylinders and a portion of its stripping mechanism, parts being broken away and in section, Figure 5 is a vertical sectional view through one of the picking cylinders, Figure 6 is a horizontal section through the same, Figure 7 is an enlarged detail plan view of certain of the driving connections of one of the cylinders and certain of the driving connections of the picking fingers thereof, Figure 8 is a top plan view of one of the stripping devices, certain parts being broken away and in section, Figure 9 is a vertical sectional view through one of the stripping devices, Figure 10 is a fragmentary sectional view enlarged and in perspective showing certain portions of one of the cylinders and illustrating in detail the internal lubricating connections thereof, Figure 11 is an enlarged vertical section through a portion of one of the cylinders and through certain of the supports of the picking fingers thereof, Figure 12 is an enlarged detail perspective view of portions of certain of the stripping belts, Figure 13 is a detail perspective view showing a fragmentary portion of one of the cylinder sections and the several parts of one of the picking fingers and its supports and connections, in detached relation, and Figure 14 is an enlarged detail perspective view of one of the picking fingers and a portion of its support, in detached relation.

Referring now to Figures 1 and 2 in particular I have shown an apparatus embodying a frame generally indicated at 15, movably supported upon front and rear wheels 16 and 17 of which the former may for steering purposes be mounted in forks 18, the latter turnable in bearings 19 upon the forwardly extended upper portion 20 of the frame. The particular steering connections, which I have briefly shown may include arms 21 as best seen in Figure 2 having a connecting tie rod 22, and to one of which arms a connecting rod 23 extends from a drag link 24. This link may have a geared connection at 25 with a steering shaft of any suitable form, a portion of which is indicated at 26 in Figure 2.

The rear wheels 17 are in practice driven through connections which for purposes of convenience may include chains 27 and 28, the former depending from sprockets at the outer ends of the rear shafts 29, to sprockets upon countershafts 30, and the latter extending rearwardly from the countershafts 30 to sprockets secured upon the rear wheels so that these latter and their supports generally indicated at 31, may yield vertically under control of supporting springs 32 mounted in the frame 15.

The rear shafts 29, journaled in the frame in transverse alinement, are shown in Figure 2 as extending from a differential 33 to which a short drive shaft 34 leads from a transmission case 35 in which suitable selective speed gearing connects the drive shaft 34 with the shaft of a motor generally indicated at 36 havings its shaft at the rear upper portion of the frame 15 connected by gears 37 with a blower generally indicated at 38 to which a suction pipe 39 leads from cotton collectors 40 having forwardly extending cotton intake tubes 41.

At its opposite sides, and intermediate the front and rear wheels 16 and 17, the frame 15 has cylinder supporting portions 42 and is provided with approximately semicylindrical shields 43 at the outer sides of these portions 42.

Rigidly secured in the upper and lower members of each of the supporting portions 42 of the main frame 15 is a vertical shaft 44, and upon each of these shafts a picker cylinder is mounted, the construction of which is a particular part of my present invention and is best seen from a consideration of Figures 3, 5 and 6. In Figure 5 in particular it will be noted that each cylinder is made up of a vertical series of horizontal sections 45 of ring shape, preferably provided with inwardly projecting bottom flanges 46 terminating around their inner edges in upstanding lips 47 whereby to form a vertical series of oil troughs each of which has an overflow pipe 48 opening downwardly through the same with its upper end upstanding to a point slightly below the upper edge of the upstanding inner lip 47 of the flange 46 whereby oil delivered onto the flange 46 of the uppermost ring section 45 of the cylinder will be collected until it overflows to the next lowermost ring section and so on down throughout the entire series of ring sections.

Each cylinder includes a base plate 49 and a top plate 50, these base and top plates preferably having roller bearings 51 and 52 on their supporting shafts 44 and completely closing the cylinder in dust and dirt proof manner when tightly clamped by vertical clamping bolts 53, particularly in view of the fact that the several ring sections 45 are preferably provided with interengaging circumferential ribs and grooves indicated at 54. At radially spaced intervals, a series of vertical shafts 55 are journaled to rotate within the cylinders, and the upper ends of these shafts project above the top plate 50 and have grooved pulleys 56. Above the flange 46 of each of the ring sections 45, each of the circumferential series of shafts 55 has a bevel gear 57 secured thereon for a purpose which will be presently described.

Each cylinder as a whole is rotated by virtue of an upper integral gear ring 58 around the outer edge of its top plate 50, which gear ring is engaged by a pinion 59 most plainly seen in Figures 3 and 7. This pinion 59 is mounted upon the lower end of a vertical shaft 60 having at its upper end a bevel gear 61 engaged by a bevel gear 62 upon an upper transverse shaft 63 whose outer end carries a sprocket 64 connected by a sprocket chain 65 with a second transverse shaft 66 which is in turn provided with a sprocket 67 connected by a chain 68 to a sprocket 69 upon one of the differential shafts 29 and which as most plainly seen in Figures 2 and 4 is preferably engaged by means of a clutch member 70 adjustable so that the two sprockets 69 through which power flows from the differential shafts to the picker cylinders may be free in order to permit the machine as a whole to be driven from place to place without revolving the picker cylinders.

It is to be noted particularly from Figure 2 that the two picker cylinders in the complete arrangement are positioned opposite one another with their peripheral series of picker fingers 71 but slightly spaced apart and that by virtue of their driving connections these picker cylinders are revolved reversely with respect to the direction of movement of the machine and at the same rate of speed as that of the machine upon opposite sides of a row of cotton plants in which the picker fingers 71 may thus protrude, seeking out the cotton bolls with minimum tearing or destructive effect upon the plant itself including its leaves.

By reference particularly to Figures 10 and 11 it will be noted that each ring section 45 of the cylinders has a circumferential series of radial wall openings 72, each threaded to receive the inner threaded end 73 of the shaft bearing member 74 of one of the picker fingers 71. Each bearing member 74 has a smooth axial bore forming a bearing for the inner portion of its respective shaft 75, whose inner end in the assembled position seen particularly in Figure 11, projects inwardly beyond the bearing member 74 and thus into the respective ring section 45 and through the sleeve 76 of a bevel gear 77. This sleeve 76 is adapted to receive thereon a slightly dished gear 78 and is provided with a lengthwise key 79 which extends into a keyway 80 of gear 78. The sleeve 76 also has diametrical openings 81 adapted to register with a diametrical opening 82 spaced from the inner end of the shaft 75 so as to receive a taper pin 83 which thus secures the locked gears 77 and 78 to the shaft 75. In the assembled position of the parts, a washer 84 around the shaft 75 is held by a transverse pin 85 against the outer end of the shaft bearing member 74, the outer end of shaft 75, beyond bearing member 74, being externally threaded as at 86 and axially bored as at 87 and having longitudinally extending and diametrically opposed slots 88.

Each picker finger 71 has a cylindrical inner portion 89 adapted to slidably interfit the bore 87 of its shaft and has a flattened portion between its outwardly projecting gradually tapering body and its said inner cylindrical portion 89, which flattened portion forms side wings 90 adapted to project into the diametrical slots 88 so as to thus effect a rotating connection between the picker finger and its shaft. Each picker finger is held in place by a hollow nut 91 which threads on the portion 86 of the shaft and has a tapering outer end with a reduced opening so as to form an abutment against the wings 90 of the picker finger in order to hold the latter in place as best seen in Figure 11. A protecting cap 92 has a reduced opening 93 at its outer end through which the respective picker finger 71 extends, and this cap is adapted to extend over the nut 91, the outwardly projecting portion of the shaft 75 as well as the outstanding body portion of the shaft bearing member 74 upon the latter of which the cap has a snug frictional engagement by virtue of its inner polygonal portion 94 and it thus becomes obvious that in the assembled position of the parts as plainly seen in Figure 11, the cap 92 operates to effectively protect the outstanding portion of the shaft against the entrance of trash and foreign matter.

The arrangement just described including the bevel gear 77 applies to the central picker finger of each series of three picker pins around each of the ring sections of each cylinder, it being noted from an inspection of Figure 6 that the picker pins are arranged in series of three of which the bevel gear 77 of the central finger is radially opposite one of the vertical shafts 55 before described and in mesh with one of the bevel gears 77 of such shafts. It will also be noted that this arrangement permits of the application and use of picker fingers in a number greatly exceeding anything heretofore possible and that from the central finger of each series of three fingers, rotation is transmitted to the other two fingers of the series through interengagement of the dished gears 78 with which all of the fingers are provided.

For the rotation of the several vertical shafts 55 arranged in circumferentially spaced relation within and around each cylinder, the pulleys 56 at the upper ends of the shafts are engaged by belts 95 extending from pulleys 96 mounted on a short vertical shaft 97 at whose upper end is a bevel gear 98 engaging a bevel gear 99 at the inner end of the shaft 66 beforementioned, and plainly seen by a comparison of Figures 2, 3, 4 and 5 and as most plainly seen in Figures 4 and 7 it is obvious that only a certain number of the shaft pulleys 56 will be engaged by the belt and these will be constantly changing during rotation of the cylinder with the result that as each of the shafts 55 approaches the inner portion of the periphery of its respective cylinder it will be engaged by the belt 95 and those picker fingers 71 under the influence thereof will be rotated and this rotation will continue until in the revolution of the cylinder the shaft passes at the outer portion of the periphery of its respective cylinder between the sides of the belt where for a space in the rotation of the cylinder the shaft will be capable of movement free of the belt.

Thus as the picker fingers approach the point at which they enter the cotton plant they commence to rotate whereby when they contact with the cotton the latter will be twisted on the rotating fingers and pulled from the plant. During subsequent revolution of the cylinder the fingers continue to rotate with the cotton thereon until they pass out of the influence of the belt between its two sides as above explained and it is during this period while free of the rotative influence of the belt 95 that the cotton is removed from the picker fingers. To promote this removal means are provided whereby the picker fingers may at this time be given slow rotation on their axes in a direction opposite to the direction of their rotation when the cotton was twisted thereon and for this purpose the upper end of the shaft 60 has a quadrant 100 rigidly secured thereto and outstanding therefrom with its curved peripheral portion formed to frictionally engage the pulleys 56 while the latter are out of the influence of belt 95. The actual removal of cotton from the picker fingers takes place at the time while they are in course of slow reversed rotation and is accomplished by a vertical series of stripping belts 101, each of which as most plainly seen in Figure 12 is composed of two strips 102 of suitable flexible material secured to one another with parallel cross wires and the like 103 whose ends project above and below the strips 102. These belts extend between the picker fingers in a vertical series, around guide rollers 104, one of which is shown in Figure 8, journaled at the outer ends of arms which are in two parts 105 and 106, and the inner ends of which arms are mounted to swing horizontally upon a vertical guide rod 107 secured in the frame of the machine to the rear of each of the picker cylinders. At their opposite ends the belts 101 pass around the guide portions 108 of a cylinder 109 secured upon a vertical rotatable shaft 110 whose upper end is provided with a pulley 111 as in Figure 9 connected by a belt 112, see Figures 1 and 2, to an enlarged pulley 113 rotatable upon the upper end of the respective cylinder shaft 44 and provided with a bevel gear 114 engaged by a bevel gear 115 secured upon the inner end of the beforementioned shaft 63.

It will be noted from Figures 2 and 4 in particular that the stripping belts 101 extend in a series at a tangent to each of the picker cylinders so that the inner run of the stripping belts engages the cotton which is twisted on the picker fingers, while moving at a direction toward the ends of the fingers, and at a time as before stated when the fingers are slowly rotating in a direction reverse to that at which they were rotating when the cotton was twisted thereon.

The stripping action is continuous by virtue of the rapidly moving stripping belts which pull the cotton endwise from the picker fingers 71 and in a rearward direction so that it may be caught by the forward ends of the suction pipes 41 which forward ends communicate with vertically disposed cotton intake members 41$^a$ as seen in Figure 1.

It thus becomes obvious that all of the actual operation on the cotton itself takes place externally of the two picker cylinders and it likewise becomes obvious that the several stripper belts, extending as they do between the vertically spaced annular series of picker fingers, will be guided by the latter to an extent sufficient to ordinarily avoid all danger of displacement from their guide rollers 104 and their actuating cylinders 109, particularly in view of the fact that the stripping belts are all held under tension by virtue of their supporting arms, and the inner portions 105 of which have cylindrical extensions 116 slidable within the tubular inner portions 117 of the sections 106 and engaged by inner springs 118 (see Figures 8 and 9) which tend to force the two sections 105 and 106 away from one another.

The fact that the actual operation upon the cotton itself takes place externally of the picker cylinders and the further fact that each picker cylinder completely houses the many gears necessary for the transmission of rotation individually to the several picker fingers, enables me to thoroughly lubricate all of these gears with the oil troughs internally of the cylinder as previously described, especially the dished gears 78 rotating with their lower portions in the oil troughs as seen in Figures 5 and 11.

In order to maintain lubricant within the oil troughs, an oil pump is utilized which may be of the ordinary gear type having its casing 119 rigidly secured within each cylinder to the upright shaft 44 as by means of a clamp 120. The intake pipe to the pump, seen at 121 particularly in Figure 10, depends from the pump casing 119 and has its lower end opening at a point slightly above the base plate 49 of each cylinder as indicated in Figure 5 and the outlet pipe 122 extends upwardly from the pump casing and has an upper angular delivery arm 123 opening into the upper oil trough. The driven shaft 124 of the oil pump depends from the pump casing 119 and has a gear 125 at its lower end in mesh with the gear 126 disposed around the lower portion of the cylinder shaft 44, with its hub 127 connected as by means of a set screw 128 and the like around a sleeve 129 upstanding from the base plate 49.

It becomes obvious from the foregoing that in the forward movement of the machine as a whole under power of the motor 36 through the connections including the differential shafts 29 and the driving chains 27 and 28, the two opposed and laterally spaced picker cylinders will be driven so that their inner portions move in the direction opposite to that of the direction of movement of the machine and, by virtue of the fact that the driving connections for actuating these cylinders proceed from the differential shafts 29 and are properly proportioned to do so, the peripheral speed of the picker cylinders is approximately the same as that of the movement of the machine as a whole so that in the course of passage of the cylinders along opposite sides of a row of cotton plants, the multitude of picker fingers proceed into and throughout the foliage of the plants in order that these picker fingers may considering their number be reasonably certain of coming in contact with every open cotton boll, and at the same time with minimum danger of breaking the branches or otherwise tearing or destroying the foliage of the plants.

At this point attention is particularly called to the structure of the cylinders themselves which by reason of the sectional fabrication readily admits of increase or decrease in the vertical lengths of the cylinders in order to adapt the machine as a whole to plants of different heights, it being a well known fact that cotton plants are much taller in some localities than in others, in addition to the difference in this respect that exists between cotton of different varieties. Attention is also called to the fact that during the movement of the picker fingers with the revolving cylinders in their actual contact with the cotton plants, they are in a rapidly rotating state by virtue of their driving connections and to the further fact that these driving connections in so far as they are located within the confines of the picker cylinders, are such as to admit of the use of a maximum number of picker fingers in order to reduce to a minimum the danger of missing any cotton bolls which are open ready for picking. This gearing just referred to not only promotes the great advantage attaching thereto as just above mentioned, but is also of a strong effective nature and is especially durable and lacking in danger of breakage and the necessity for frequent replacements, by virtue of the fact that the cylinders as constructed completely enclose and protect the gearing against the adverse action of dirt, trash and other foreign matter and by virtue of the further fact of the provision I have made for constant thorough lubrication of each and every gear, picker finger bearing and the like through the use of oil troughs in which the great majority of the gears are set to run and the further provision of efficient non-failing means for keeping these oil troughs full to overflowing at all times during action.

Experience has shown that it is not necessary to actually roughen the cotton engaging portions of the picker fingers and it is therefore contemplated in practice that these fingers will simply be machined without polishing or burnishing so that while they may be thus adapted to effectively take up and wrap the cotton thereon in view of their speedy rotation on their own axes, the subsequent operation of stripping the cotton from the picker fingers will be rendered as easy as the circumstances admit.

After the cotton has been picked, that is wrapped upon the picker fingers, the latter in their further movement with the revolving cylinders become detached from the belts which drive the same and are then slowly rotated in a reverse direction by virtue of the engagement of the pulleys with the stationary quadrants, and in view of this slow reverse rotation and the tangential disposition of the endless stripping belts, it becomes comparatively easy to pull the cotton off of the ends of the tapering fingers and completely clear the latter for a subsequent operation of the same nature.

It is also obvious that by virtue of the particular manner of supporting the stripping belts or brushes, their inner portions which project between the horizontal rows of picker fingers may be readily swung outwardly free of the picker fingers whereby replacement or repair when this becomes necessary may be accomplished in a ready simple manner.

In so far as the subsequent disposition of the cotton is concerned, that is its transportation away after being stripped from the picker fingers, my invention contemplates the use of any suitable suction apparatus and the connections shown and described for this purpose must therefore be considered only as one of the many ways final disposition of the cotton may be accomplished.

I also desire that it be understood that my improvements relating principally as they do to the mechanism for taking the cotton from the plant in the first instance and then stripping the cotton free from the picker fingers, are capable of being utilized with various forms of moving machines, proceeding either under their own power or through the use of draft animals.

I claim:

1. In a cotton picker, a pair of laterally opposed picker cylinders revoluble upon vertical axes and each consisting of a vertical series of ring shaped sections clamped together, each section having an annular series of apertures, bearing members threaded in the said apertures, shafts having bearing through said members, gears secured upon the shafts beyond the inner ends of said bearing members and interengaging within the ring sections in series of three entirely therearound, the central shaft of each series having a second gear, a picker finger detachably connected to the outer end of each of said shafts to rotate therewith, a series of vertical shafts within and around each cylinder having an exteriorly projecting upper end, gears mounted on said vertical shafts at spaced points in their length and disposed opposite and in engagement with the said second gears of the central shafts of the various series, and means engageable with the exteriorly projecting upper ends of the shafts for rotating the same.

2. In a cotton picker, a pair of laterally opposed picker cylinders revoluble upon vertical axes and each consisting of a vertical series of ring shaped sections clamped together, each section having an annular series of apertures, bearing members threaded in the said apertures, shafts having bearing through said members, gears secured upon the shafts beyond the inner ends of said bearing members and interengaging within the ring sections in series of three entirely therearound, the central shaft of each series having a second gear, a picker finger detachably connected to the outer end of each of said shafts to rotate therewith, a series of vertical shafts within and around each cylinder having an exteriorly projecting upper end, gears mounted on said vertical shafts at spaced points in their length and disposed opposite and in engagement with the said second gears of the central shafts of the various series, said exteriorly projecting ends of said upper shafts being provided with pulleys and connections for rotating the vertical shafts including a belt extending to one side of each of the cylinders and with which the said pulleys of the vertical shafts are engageable and disengageable during revolution of the cylinders.

3. In a cotton picker, a pair of laterally opposed picker cylinders revoluble upon vertical axes and each consisting of a vertical series of ring shaped sections clamped together, each section having an annular series of apertures, bearing members threaded in the said apertures, shafts having bearing through said members, gears secured upon the shafts beyond the inner ends of said bearing members and interengaging within the ring sections in series of three entirely therearound, the central shaft of each series having a second gear, a picker finger detachably connected to the outer end of each of said shafts to rotate therewith, a series of vertical shafts within and around each cylinder having an exteriorly projecting upper end, gears mounted on said vertical shafts at spaced points in their length and disposed opposite and in engagement with the said second gears of the central shafts of the various series, said exteriorly projecting ends of said upper shafts being provided with pulleys and connections for rotating the vertical shafts including a belt extending to one side of each of the cylinders and with which the said pulleys of the vertical shafts are engageable and disengageable during revolution of the cylinders, and a stationary quadrant with which the said rollers of the vertical shafts are engageable while free of contact with the said belts.

4. In a cotton picker, a pair of laterally opposed picker cylinders revoluble upon vertical axes and each consisting of a vertical series of ring shaped sections clamped together, each section having an annular series of apertures, bearing members threaded in the said apertures, shafts having bearing through said members, gears secured upon the shafts beyond the inner ends of said bearing members and interengaging within the ring sections in series of three entirely therearound, the central shaft of each series having a second gear, a picker finger detachably connected to the outer end of each of said shafts to rotate therewith, a series of vertical shafts within and around each cylinder having an exteriorly projecting upper end, gears mounted on said vertical shafts at spaced points in their length and disposed opposite and in engagement with the said second gears of the central shafts of the various series, and means engageable with the exteriorly projecting upper ends of the shafts for rotating the same, each of said ring sections of the cylinders having an inwardly projecting annular oil trough in which the said shaft connecting gears are rotatable.

5. In a cotton picker, a pair of laterally opposed picker cylinders revoluble upon vertical axes and each consisting of a vertical series of ring shaped sections clamped together, each section having an annular series of apertures, bearing members threaded in the said apertures, shafts having bearing through said members, gears secured upon the shafts beyond the inner ends of said bearing members and interengaging within the ring sections in series of three entirely therearound, the central shaft of each series having a second gear, a picker finger detachably connected to the outer end of each of said shafts to rotate therewith, a series of vertical shafts within and around each cylinder having an exteriorly projecting upper end, gears mounted on said vertical shafts at spaced points in their length and disposed opposite and in engagement with the said second gears of the central shafts of the various series, and means engageable with the exteriorly projecting upper ends of the shafts for rotating the same, each of said ring sections of the cylinders having an inwardly projecting annular oil trough in which the said shaft connecting gears are rotatable, and each of said oil troughs having an overflow member opening into the next lowermost trough.

6. In a cotton picker, a pair of laterally opposed picker cylinders revoluble in spaced relation upon vertical axes and including a vertical series of ring shaped sections clamped together and each provided with an internal annular trough, an annular series of picker fingers radially outstanding from each of said ring sections, means for rotating the several picker fingers during their revolution with the cylinders including gearing within the cylinders in engagement with one another within the said troughs of the ring sections, and means exteriorly of and adjacent to each of the cylinders for stripping cotton from the picker fingers.

7. In a cotton picker, a pair of laterally opposed picker cylinders, revoluble in spaced relation upon vertical axes and including a vertical series of ring shaped sections clamped together, an annular series of picker fingers radially outstanding from each of said ring sections, means for rotating the several picker fingers during their revolution with the cylinders including gearing within the cylinders in engagement with one another and means exteriorly of and adjacent to each of the cylinders for stripping cotton from the picker fingers, said last named means operating between the vertically spaced annular series of picker fingers and consisting of flexible belts having wires embedded therein and projecting beyond the edges thereof.

8. In a cotton picker, a pair of laterally spaced and opposed picker cylinders, connections for revolving the same about their vertical axes, a plurality of vertically spaced annular series of picker fingers carried by each of said cylinders and rotatable on their own axes, vertical shafts geared to said fingers and having pulleys at one end, belts engaging said pulleys whereby to rotate each thereof during a portion of each revolution of the cylinders, stationary quadrants with which the fingers are engageable to rotate each finger in a reverse direction during the remainder of each revolution of the picker cylinders, and means shiftable between and away from the fingers for stripping cotton from the said picker fingers during their reverse rotation.

9. In a cotton picker, picker cylinders each formed of a vertical series of concentric ring sections and having means to lock the said sections together whereby each cylinder forms an oil chamber, picker fingers radiating from each of the cylinders, and means to rotate the said picker fingers during revolution of the picker cylinders, including gears within the cylinders in the presence of oil therein.

10. In a cotton picker, picker cylinders each of sectional built-up form having means connecting the sections thereof in dust proof relation whereby each cylinder forms an oil chamber, a plurality of picker fingers radiating from each of the cylinders, means for revolving the cylinders, means for rotating the picker fingers during revolution of the cylinders, including gearing within the cylinders, and means within each cylinder for constantly supplying oil to the rotating gears of the picker fingers.

11. In a cotton picker, picker cylinders each forming an oil chamber therein, picker fingers radiating from each cylinder, means for revolving the cylinders, and means for rotating the picker fingers during revolution of the cylinders including gearing located within the cylinders.

12. In a cotton picker, picker cylinders each having wall openings, bearing members threaded through the wall openings, shafts whose inner portions are journaled through the said bearing members, having externally threaded outer ends provided with lengthwise bores and with diametrically opposed slots, picker fingers having cylindrical inner end portions disposed within the shaft bores and having flattened portions intermediate their ends forming side wings to extend into the diametrical slots, and tubular nuts around the picker fingers engageable with the threaded portions of the said shafts and having partially closed outer ends for confining the wings of the picker fingers.

13. In a cotton picker, picker cylinders each having wall openings, bearing members threaded through the wall openings, shafts whose inner portions are journaled through the said bearing members, having externally threaded outer ends provided with lengthwise bores and with diametrically opposed slots, picker fingers having cylindrical inner end portions disposed within the shaft bores and having flattened portions intermediate their ends forming side wings to extend into the diametrical slots, tubular nuts around the picker fingers engageable with the threaded portions of the said shafts and having partially closed outer ends for confining the wings of the picker fingers, and caps of tubular form to surround the said tubular ends and the outwardly projecting portions of said shafts, having means to telescope and frictionally engage the outwardly projecting portions of said bearing members.

14. A cotton picker of the type described including picker fingers having elongated tapering outer portions and cylindrical inner portions and having flattened sections intermediate the tapering and cylindrical portions forming side wings for the purpose described.

15. In a cotton picker, revoluble picker cylinders having radially outstanding rotatable picker fingers arranged in vertically spaced annular series, stripping means for the said cylinders including a series of vertically spaced stripping belts extending between the series of fingers and provided with stripping elements projecting beyond their opposite sides and shiftable supports for said belts with which the latter are movable into and out of effective engagement with the fingers.

16. In a cotton picker, vertically disposed revoluble picker cylinders, vertically spaced annular series of rotatable picker fingers radiating from said cylinders, and a series of vertically spaced stripping belts having stripping elements projecting beyond the edges thereof and swingable supports for holding said elements at one side of each of said cylinders with their inner ends extending between the series of picker fingers and shiftable toward and away from the same.

17. In a cotton picker, vertically disposed revoluble picker cylinders, vertically spaced annular series of rotatable picker fingers radiating from said cylinders, and a series of vertically spaced stripping belts having stripping elements projecting beyond the edges thereof and disposed at one side of each of said cylinders with their inner ends extending between the series of picker fingers, and means to swingably support the said inner ends of said stripping belts for shifting movement beyond and out of contact with the picker fingers.

18. In a cotton picker, vertically disposed revoluble picker cylinders, vertically spaced annular series of rotatable picker fingers carried by the cylinders, series of vertically spaced stripping belts mounted at one side of each of said cylinders and normally disposed tangentially with respect to the cylinders with their inner ends projecting between the series of picker fingers, vertically rotatable cylinders around which the outer ends of said belts extend and angularly shiftable arms having rollers at their ends around which the inner ends of said stripping belts extend.

19. In a cotton picker, vertically disposed revoluble picker cylinders, vertically spaced annular series of rotatable picker fingers carried by the cylinders, series of vertically spaced stripping belts mounted at one side of each of said cylinders and normally disposed tangentially with respect to the cylinders with their inner ends projecting between the series of picker fingers, vertically rotatable cylinders around which the outer ends of said belts extend and angularly shiftable arms having rollers at their ends around which the inner ends of said stripping belts extend, said arms being in sections and having springs between the sections thereof to maintain the stripping belts under tension at all times.

20. In a cotton picker, a picking cylinder, picking fingers radiating from said cylinder, vertical shafts in an annular series within and around the cylinder, and connections for driving said shafts, said picking fingers being arranged in series of which the fingers of each series are in geared connection, one of the fingers of each series being also in geared connection with one of the said shafts.

21. In a cotton picker, a picking cylinder, picking fingers radiating from said cylinder, vertical shafts in an annular series within and around the cylinder and upstanding therefrom having gears at vertically spaced points thereon, said picking fingers being arranged in horizontal series of which the fingers of each series are in geared connection with one another, one of the fingers of each series being also provided with a gear meshing with one of the gears of said shafts, and means engaging said shafts for rotating the fingers.

22. In a cotton picker, a picking cylinder, picking fingers radiating from said cylinder, vertical shafts in an annular series within and around the cylinder and upstanding therefrom having gears at vertically spaced points thereon, said picking fingers being arranged in horizontal series of which the fingers of each series are in geared connection with one another, one of the fingers of each series being also provided with a gear meshing with one of the gears of said shafts, said shafts projecting above the cylinder and having pulleys thereon, and means with which the pulleys are engageable during revolution of the cylinder, for rotating the picking fingers.

HIRAM NEWTON BERRY.